United States Patent Office 3,328,434
Patented June 27, 1967

3,328,434
4β,5β-METHYLENE-ANDROSTANE DERIVATIVES
AND THEIR PREPARATION
Lawrence H. Knox and Alexander D. Cross, Mexico City,
Mexico, assignors to Syntex Corporation, Panama, Panama, a corporation of Panama
No Drawing. Filed Feb. 17, 1965, Ser. No. 433,466
13 Claims. (Cl. 260—397.4)

The present invention relates to novel cyclopentanophenanthrene derivatives and to a process for the production thereof.

More particularly the present invention relates to novel 4β,5β-methylene-androstan-3-one derivatives.

The novel compounds of the present invention are represented by the following formula:

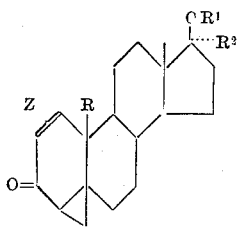

In the above formula R represents hydrogen or methyl; $R^1$ may be hydrogen or a lower hydrocarbon carboxylic acyl group of less than 12 carbon atoms; $R^2$ may be hydrogen, lower alkyl, lower alkenyl or lower alkynyl; and Z represents a double bond or a saturated linkage.

The acyl group is derived from hydrocarbon carboxylic acids containing less than 12 carbon atoms which may be saturated or unsaturated, of straight, branched, cyclic or cyclic-aliphatic chain, or aromatic, and may be substituted by functional groups such as hydroxy, alkoxy containing up to 5 carbon atoms, acyloxy containing up to 12 carbon atoms, nitro, amino or halogen. Typical ester groups are the acetate, propionate, enanthate, benzoate, trimethylacetate, t-butylacetate, phenoxyacetate, cyclopentylpropionate, aminoacetate, and β-chloropropionate.

The novel compounds of the present invention represented by the above formula are anabolic androgenic agents with a favorable anabolic androgenic ratio. In addition they have anti-estrogenic, anti-gonadotrophic, anti-fibrillatory and appetite stimulating properties. Furthermore, they lower the blood cholesterol level, relieve premenstrual tension and suppress the output of the pituitary gland.

The novel compounds of the present invention may be prepared by the process exemplified as follows:

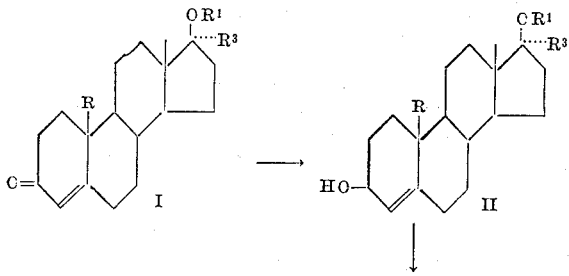

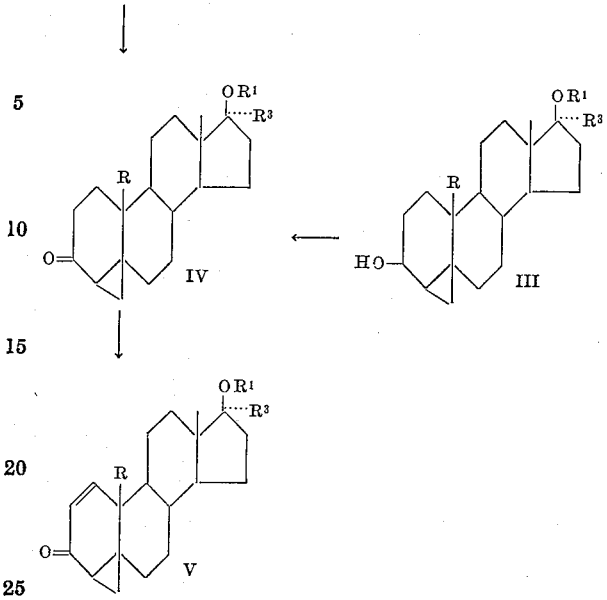

In the above formulae R and $R^1$ have the same meaning as set forth hereinbefore, and $R^3$ represents hydrogen, lower alkyl or lower alkinyl.

In accordance with the above scheme, the starting compound (I) which is a testosterone derivative, is reduced with sodium borohydride under conventional conditions, preferably in a non-aqueous medium to give the corresponding 3β-hydroxy compound (II) which upon treatment with methylene iodide in the presence of zinc-copper couple affords the corresponding 4β,5β-methylene-androstane-3β,17β-diol derivative (III). Upon conventional oxidation with chromium trioxide, there is obtained the corresponding 3-keto compound (IV), which is dehydrogenated under conventional conditions, for example with dichlorodicyano benzoquinone, selenium dioxide, etc., to give the corresponding Δ¹-dehydro compound (V).

The novel 19-nor compounds of the present invention may also be obtained by the process illustrated by the following equation:

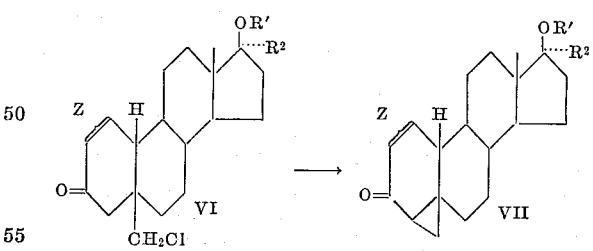

In the above formulae $R^1$, $R^2$ and Z have the same meaning as set forth hereinbefore.

In accordance with the above equation, the starting compound (VI) which is a 5β-chloromethyl-19-nor-androstan-17β-ol-3-one derivative, is treated with an alkali metal ethoxide in a suitable solvent such as ethanol, dioxane, etc., at around room temperature, for a period of time of the order of 2 hours to 6 hours, thus affording the corresponding 4β,5β-methylene-19-nor-androstan-17β-ol-3-one derivative (VII).

The compounds of the present invention having a primary and/or a secondary hydroxyl group, are conventionally acylated in pyridine with an acylating agent, such as an anhydride or a chloride of a hydrocarbon carboxylic acid of the type described hereinbefore to give the corresponding acylates.

The compounds of the present invention having in the molecule a tertiary hydroxyl group, e.g., at C–17 are conventionally esterified in the presence of p-toluenesulfonic acid with an acylating agent, such as acetic anhydride, caproic anhydride, cyclopentylpropionic anhydride, or enanthic anhydride to produce the corresponding esters.

The 17α-ethinyl compounds of the present invention may be converted into the corresponding 17α-vinyl compound by hydrogenation in the presence of a suitable catalyst, for example 2% palladium on calcium carbonate.

The following specific examples serve to illustrate but are not intended to limit the scope of the present invention:

*Example I*

A solution of 2 g. of sodium borohydride in 30 cc. of methanol was added with stirring to a solution of 2 g. of testosterone acetate in 40 cc. of tetrahydrofuran. The mixture was kept at room temperature for 2 hours, the excess reagent was decomposed by addition of acetic acid, the resulting solution concentrated to small volume in vacuo and diluted with water. The product was extracted with ethyl acetate, the extract was washed with water, dried and evaporated. Crystallization of the solid from acetone-hexane gave the 17-acetate of $\Delta^4$-androstene-3β, 17β-diol (Compound No. 1).

The starting compounds listed under I were treated by the same procedure, thus affording the corresponding products set forth under II:

| I | Cpd. No. | II |
|---|---|---|
| 19-nor-testosterone acetate | 2 | $\Delta^4$-19-nor-androstene-3β, 17β-diol 17-acetate. |
| 17α-methyl-testosterone | 3 | 17α-methyl-$\Delta^4$-androstene-3β, 17β-diol. |
| 17α-ethinyl-testosterone | 4 | 17α-ethinyl-$\Delta^4$-androstene-3β, 17β-diol. |
| 17α-methyl-19-nor-testosterone | 5 | 17α-methyl-19-nor-$\Delta^4$-androstene-3β,17β-diol. |
| 17α-ethinyl-19-nor-testosterone | 6 | 17α-ethinyl-19-nor-$\Delta^4$-androstene-3β,17β-diol. |

*Example II*

A mixture of 4 g. of methylene iodide, 1 g. of zinc-copper couple (prepared according to H. E. Simmons and R. B. Smith, J. Am. Chem. Soc. 81, 4256 (1959)) and 20 cc. of ethyl ether was refluxed during 1 hour. The resulting mixture was filtered and the filtrate was added to a solution of 1 g. of compound No. 1 in 20 cc. of ethyl ether. The whole was refluxed during 1 hour, then there were evaporated 15 cc. of solvent and the liquid residue was introduced into a tube, which was manitained at 100 cc. during 2 hours. Then it was cooled, the content was diluted with ether, then successively washed with a 10% solution of ammonium chloride, a 5% solution of sodium carbonate, and water to neutral, then dried over sodium sulfate and evaporated to dryness. The solid residue was chromatographed on an alumina column, thus giving 4β,5β-methylene-androstane-3β,17β-diol-17-acetate (Cpd. No. 7).

The compounds Nos. 2 to 6, inclusive, were treated according to the above procedure, thus affording respectively:

Cpd. No.:
    8____4β,5β-methylene-19-nor - androstane - 3β,17β-diol 17-acetate.
    9____4β,5β-methylene-17α-methyl - androstane - 3β, 17β-diol.
    10____4β,5β-methylene-17α-ethinyl-androstane - 3β, 17β-diol.
    11____4β,5β-methylene-17α-methyl-19 - nor - androstane-3β,17β-diol.
    12____4β,5β-methylene-17α-ethinyl-19 - nor - androstane-3β,17β-diol.

*Example III*

A solution of 1 g. of Cpd. No. 7 in 10 cc. of acetone was cooled to 0° C. and treated under an atmosphere of nitrogen with stirring, with a solution of 8 N-chromic acid (prepared by mixing 26 g. of chromium trioxide with 23 cc. of concentrated sulfuric acid and diluting with water to 100 cc.), until the color of the reagent persisted in the mixture. It was stirred for 5 minute further at 0–5° C. and diluted with water. The precipitate was collected, washed with water and dried under vacuum, thus affording a crude product which upon recrystallization from acetone-hexane gave 4β,5β-methylene-19-nor-androstan-17β-ol-3-one acetate (Cpd. No. 13).

The Cpds. Nos. 8 to 12, inclusive, were treated by the same procedure thus affording respectively the following products:

Cpd. No.:
    14____4β,5β-methylene - 19 - nor-androstan-17β-ol-3-one acetate.
    15____4β,5β-methylene - 17α - methyl-androstan-17β-ol-3-one.
    16____4β,5β-methylene - 17α - ethinyl-androstan-17β-ol-3-one.
    17____4β,5β-methylene - 17α - methyl-19-nor-androstan-17β-ol-3-one.
    18____4β,5β-methylene - 17α - ethinyl-19-nor-androstan-17β-ol-3-one.

*Example IV*

A mixture of 500 mg. of Cpd. No. 13, 10 cc. of dioxane and 350 mg. of 2,3-dichloro-5,6-dicyano-1,4-benzoquinone was refluxed for 10 hours. It was then cooled the 2,3-dichloro - 5,6 - dicyano-1,4-benzohydroquinone formed during the reaction filtered off and the filtrate evaporated to dryness. The residue was dissolved in acetone and filtered through 10 g. of alumina. Crystallization from acetone-hexane gave 4β,5β-methylene-$\Delta^1$-androsten-17β-ol-3-one acetate (Cpd. No. 19).

The Cpds. Nos. 14 to 18, inclusive, were treated according to the above procedure, thus affording respectively:

Cpd. No.:
    20____4β,5β-methylene-$\Delta^1$ - 19 - nor-androsten-17β-ol-3-one acetate.
    21____4β,5β,-methylene - 17α - methyl-$\Delta^1$-androsten-17β-ol-3-one.
    22____4β,5β-methylene - 17α - ethinyl-$\Delta^1$-androsten-17β-ol-3-one.
    23____4β,5β-methylene - 17α - methyl-$\Delta^1$-19-nor-androsten-17β-ol-3-one.
    24____4β,5β-methylene - 17α - ethinyl-$\Delta^1$-19-nor-androsten-17β-ol-3-one.

*Example V*

All the starting compounds mentioned in this Example were prepared according to L. H. Knox, U. S. patent application Ser. No. 406,157 filed Oct. 23, 1964, now U.S. Patent No. 3,272,802, from the corresponding 5,19-cyclo-$\Delta^1$-androsten-3-one compound, by treatment thereof, with concentrated hydrochloric acid, to give the corresponding 5β-chloromethyl-$\Delta^1$-19-nor-androstene-3-one derivative which upon conventional hydrogenation give the corresponding 1,2-dihydro derivatives.

To a solution of 1 g. of 5β-chloromethyl-$\Delta^1$-19-nor-androsten-17β-ol-3-one in 20 cc. of ethanol there was added a solution of 250 mg. of sodium in 20 cc. of ethanol. The resulting mixture was stirred for 1.5 hours at room temperature and then it was neutralized with acetic-acid.

The whole was then extracted with ether, the extract was washed with water, dried over anhydrous sodium sulfate and evaporated to dryness. The residue was crystallized from methanol thus giving 4β,5β-methylene-Δ¹-19-nor-androsten-17β-ol-3-one. (Cpd. No. 25).

The starting compounds listed hereinafter under I were treated by the latter procedure, thus affording the corresponding products set forth under II:

| I | Cpd. No. | II |
|---|---|---|
| 5β-chloromethyl-17α-methyl-Δ¹-19-nor-androsten-17β-ol-3-one. | 26 | 4β,5β-methylene-17α-methyl-Δ¹-19-nor-androsten-17β-ol-3-one. |
| 5β-chloromethyl-17α-vinyl-Δ¹-19-nor-androsten-17β-ol-3-one. | 27 | 4β,5β-methylene-17α-vinyl-Δ¹-19-nor-androsten-17β-ol-3-one. |
| 5β-chloromethyl-17α-ethinyl-Δ¹-19-nor-androsten-17β-ol-3-one. | 28 | 4β,5β-methylene-17α-ethinyl Δ¹-19-nor-androsten-17β-ol-3-one. |
| 5β-chloromethyl-19-nor-androstan-17β-ol-3-one. | 29 | 4β,5β-methylene-19-nor-androstan-17β-ol-3-one. |
| 5β-chloromethyl-17α-methyl-19-nor-androstan-17β-ol-3-one. | 30 | 4β,5β-methylene-17α-methyl-19-nor-androstan-17β-ol-3-one. |
| 5β-chloromethyl-17α-vinyl-19-nor-androstan-17β-ol-3-one. | 31 | 4β-5β-methylene-17α-vinyl-19-nor-androstan-17β-ol-3-one. |
| 5β-chloromethyl-17α-ethinyl-19-nor-androstan-17β-ol-3-one. | 32 | 4β-5β-methylene-17α-ethinyl-19-nor-androstan-17β-ol-3-one. |

The compounds Nos. 26, 28, 30 and 32 are identical respectively, to compounds Nos. 23, 24, 17 and 18.

*Example VI*

A solution of 1 g. of Cpd. No. 16 in 40 cc. of pyridine was hydrogenated at 25° C. and 570 mm. in the presence of 400 mg. of prehydrogenated 2% palladium-on-calcium carbonate catalyst.

When 1.1 molar equivalents of hydrogen had been absorbed, the reaction was stopped, the catalyst separated by filtration through celite, washed with ethyl acetate and the combined solution evaporated to dryness in vacuo, yielding the crude vinyl derivative. This crude product was dissolved in ethyl acetate, the organic solution washed with dilute hydrochloric acid and water to neutral, dried and evaporated to dryness. Recrystallization from acetone gave 4β,5β-methylene-17α-vinyl-androstan-17β-ol-3-one (Cpd. No. 33).

The Cpds. Nos. 18, 22 and 24, were treated by the same procedure, thus affording the corresponding 17α-vinyl derivatives.

*Example VII*

A mixture of 1 g. of 4β,5β-methylene-19-nor-androstan-17β-ol-3-one (Cpd. No. 29), 4 cc. of pyridine and 2 cc. of propionic anhydride was kept at room temperature overnight poured into ice water, the formed precipitate was filtered, washed with water and dried. Crystallization from acetone-hexane gave the 17-propionate of 4β,5β-methylene-19-nor-androstan-17β-ol-3-one (Cpd. No. 34).

Compound No. 29 was treated according to the latter procedure, except that instead of propionic anhydride there was used caproic anhydride, cyclopentylpropionic anhydride and enanthic anhydride, thus affording the corresponding caproate, cyclopentylpropionate and enanthate.

*Example VIII*

To a solution of 5 g. of 4β,5β-methylene-17α-methyl-Δ¹-19-nor-androsten-17β-ol-3-one (Cpd. No. 23 or 26) in 100 cc. of anhydrous benzene there were added 1 g. of p-toluenesulfonic acid and 10 cc. of caproic anhydride and the mixture was allowed to stand for 24 hours at room temperature, poured into ice water and the resulting mixture stirred to effect hydrolysis of the excess anhydride. The benzene layer was separated and washed with 10% sodium carbonate solution and water. Drying, evaporation and crystallization of the residue from ether-hexane produced the caproate of 4β,5β-methylene-17α-methyl-Δ¹-19-nor-androsten-17β-ol-3-one (Cpd. No. 35).

The Cpds. Nos. 27, 28, 30, 31, 32 and 33 were treated according to the latter procedure, thus giving the corresponding caproates.

*Example IX*

The starting compounds of the foregoing example were treated exactly by the same procedure, except that caproic anhydride was substituted by acetic anhydride, cyclopentylpropionic anhydride and enanthic anhydride, thus affording respectively the corresponding acetates, cyclopentylpropionates and enanthates.

We claim:
1. A compound of the following formula:

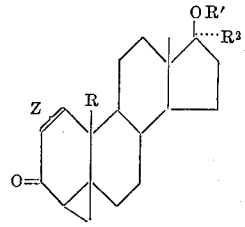

wherein R is hydrogen; R¹ is a member of the group consisting of hydrogen and a hydrocarbon carboxylic acyl group of less than 12 carbon atoms; R² is selected from the group consisting of hydrogen, lower alkyl, lower alkenyl and lower alkinyl; and Z is selected from the group consisting of a double bond and a saturated linkage.

2. 4β,5β-methylene-19-nor-androstan-17β - ol - 3-one acetate.

3. 4β,5β-methylene-Δ¹-19-nor-androsten-17β - ol - 3-one acetate.

4. 4β,5β-methylene-17α-methyl-Δ¹-androsten - 17β - ol-3-one.

5. 4β,5β-methylene-17α-ethinyl-Δ¹-androsten - 17β - ol-3-one.

6. 4β,5β-methylene-17α-methyl-Δ¹ - 19 - nor-androsten-17β-ol-3-one.

7. 4β,5β-methylene-17α-vinyl-Δ¹-19 - nor - androsten-17β-ol-3-one.

8. 4β,5β-methylene-17α-ethinyl-Δ¹ - 19 - nor-androsten-17β-ol-3-one.

9. 4β,5β-methylene-19-nor-androstan-17β-ol-3-one.

10. 4β,5β-methylene-17α-methyl - 19 - nor-androstan-17β-ol-3-one.

11. 4β,5β-methylene-17α-vinyl - 19 - nor-androstan-17β-ol-3-one.

12. 4β,5β-methylene-17α-ethinyl - 19 - nor-androstan-17β-ol-3-one.

13. A process for the production of a 4β,5β-methylene-3-keto-19-nor-androstane derivative which comprises treating the corresponding 5β-chloromethyl compounds with an alkali metal ethoxide.

References Cited

UNITED STATES PATENTS 3,120,515  1/1964  Christiansen _____ 260—239.5

LEWIS GOTTS, *Primary Examiner.*

ELBERT L. ROBERTS, *Examiner.*